W. C. SHIPHERD.
JOURNAL.
No. 192,023.  Patented June 12, 1877.
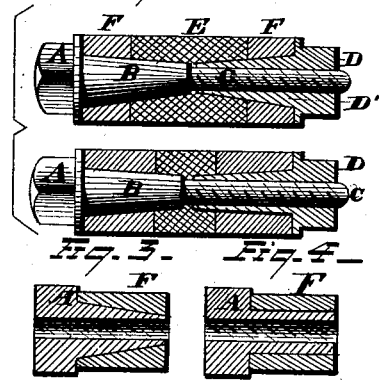
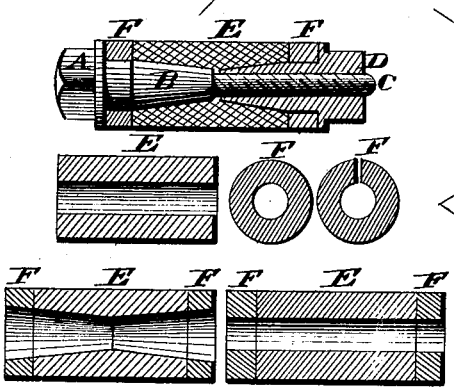
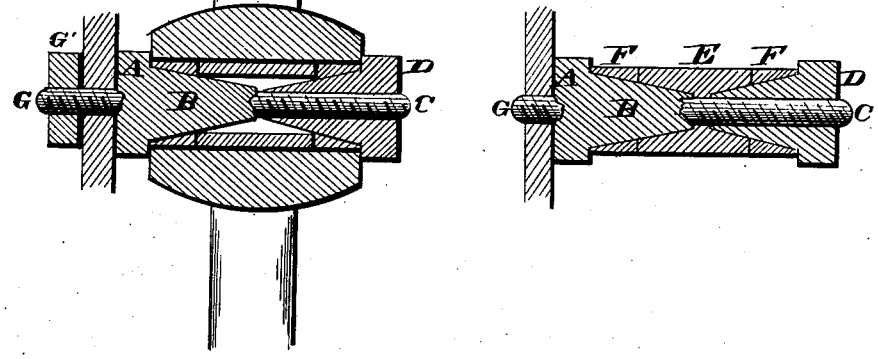
WITNESSES
INVENTOR
Wm C. Shipherd.
By Leggett and Leggett,
ATTORNEYS

UNITED STATES PATENT OFFICE.

WILLIAM C. SHIPHERD, OF CLEVELAND, OHIO, ASSIGNOR OF TWO-THIRDS HIS RIGHT TO J. J. BROOKS AND S. K. DAVIS, OF SAME PLACE.

IMPROVEMENT IN JOURNALS.

Specification forming part of Letters Patent No. 192,023, dated June 12, 1877; application filed February 27, 1877.

*To all whom it may concern:*

Be it known that I, WILLIAM C. SHIPHERD, of Cleveland, in the county of Cuyahoga and State of Ohio, have invented certain new and useful Improvements in Bolts or Journals; and I do hereby declare the following to be a full, clear, and exact description of the invention, such as will enable others skilled in the art to which it pertains to make and use it, reference being had to the accompanying drawing, which form part of this specification.

My invention relates to an improved bolt or journal; and consists in the combination of devices and appliances, as hereinafter specified and claimed.

In the drawing, Figure 1 is a longitudinal central section of my improved compensating bolt or journal. Fig. 2 shows a variation of the invention. Fig. 3 is a separate view of the compensating-nut; Fig. 4, a variation of the same. Fig. 5 represents a variation of the invention.

This bolt is constructed with a head or shoulder, A, a conical stem, B, adjacent to or near the head, and a straight cylindrical stem, C, which is provided, preferably, with a screw-thread. D is a nut provided with a conical stem or collar, D', springing from a point adjacent or near to the shoulder D of the nut. E is a tubular packing-cylinder upon the outer surface, or practically so, and provided with either a cylindrical or double conical opening through it. F is packing adjacent to the head A and nut D.

This compensating bolt or journal is designed for use anywhere where a bolt is ordinarily employed as a journal, or where a bolt is subjected to such wear as to cause lost motion about it—such, for instance, as thill-couplings, pump-handles, and in any other like places; and I would therefore not limit myself to any particular employment for the said compensating bolt or journal.

It will be observed that the outer surface of the packing E and F is cylindrical, or practically so, the object being to adapt the device to be readily inserted in any common cylindrical opening. Heretofore where a double conical bolt and nut have been employed they have necessitated the employment of a corresponding double conical eye for receiving the bolt or journal. This outer cylindrical form of the packing obviates that necessity, and adapts the compensating bolt or journal to the ordinary cylindrical eye or opening.

The central packing E may be of rubber, or it may be of rawhide, or of any other suitable substance. The packing F may likewise be of either rubber or leather, or of other similar suitable substance. Where the bolt or journal is employed to sustain simply a rotary reciprocating movement, as in a thill-coupler or pump-handle, &c., I prefer to make the central packing of rubber, and the other packings of leather or its equivalent; but where the bolt or journal is employed in a locality where there is complete revolution around it, I would make the central packing of leather, rawhide, or other suitable substance of that character.

It is not absolutely essential that the conical stems should project immediately from the shoulders A and D, but they may, as shown in Fig. 2, be made cylindrical for a short distance and then terminated in a conical form.

It is also apparent that the nut D, provided with the conical stem or collar D', and with the packing F, of rubber or its equivalent, will, in connection with the bolt-stem C, when run into or against the thing through which the bolt passes, serve at the same time as a lock to prevent the nut from working off; and this it will do whether the stem D' is or is not conical. If it is cylindrical the packing will hold by reason of its resistance to compression. If the stem D' is conical it will hold by reason of being expanded into the eye through which it passes. Of course it is immaterial whether the central packing E is provided with a cylindrical opening or with a double conical opening, as the effect is practically the same in both cases.

If this bolt is to be employed as a stationary stud or bracket-journal, being attached to some other object, I would provide it with a stem or shank, G, securing it to the said object, and a nut, G', as shown in Fig. 5. Such a construction would adapt the device for use as the journal-stud for sewing-machine drive-wheels.

Where there is a complete revolution about this stud or journal, as, for instance, in the case of a sewing-machine drive-wheel, any loose pulley or packing, E and F, may be made, if desired, of a suitable anti-friction or other metal, but, in that case, the packing-rings should all be split, thus obtaining all the advantages of a compensating journal without necessitating any other than a cylindrically-bored hub or eye.

It is apparent that I need not employ at all times the packing E and F made separately, but in many instances it may be all in a single piece. Moreover, the central piece E may be divided into two or more bands and rings; the form here shown, however, is convenient, and is adapted for most purposes.

I am aware that axle-bearings have been made in two parts, provided with conical bearings upon which are fitted conical packings, and hence I do not claim such construction; but

What I claim is—

1. The combination of a bolt, A, provided with conical stem B and cylindrical stem C, with the nut D, provided with the conical stem D', and the cylindrical packing E F, substantially as and for the purpose described.

2. In connection with the double conical compensating bolt and nut and the cylindrical packing, the stud or shank G, with or without the nut G', substantially as and for the purpose described.

In testimony whereof I have signed my name to this specification in the presence of two subscribing witnesses.

WILLIAM C. SHIPHERD.

Witnesses:
FRANCIS TOUMEY,
EDWARD WALSH.